(12) United States Patent
Grover et al.

(10) Patent No.: US 7,656,403 B2
(45) Date of Patent: Feb. 2, 2010

(54) IMAGE PROCESSING AND DISPLAY

(75) Inventors: Trent N. Grover, Ames, IA (US); Justin Hare, Orlando, FL (US)

(73) Assignee: Micoy Corporation, Des Moines, IA (US)

( * ) Notice: Subject to any disclaimer, the term of this patent is extended or adjusted under 35 U.S.C. 154(b) by 532 days.

(21) Appl. No.: 11/128,712

(22) Filed: May 13, 2005

(65) Prior Publication Data

US 2006/0256113 A1 Nov. 16, 2006

(51) Int. Cl.
*G06T 17/10* (2006.01)
(52) U.S. Cl. .................................................. 345/423
(58) Field of Classification Search ................. None
See application file for complete search history.

(56) References Cited

U.S. PATENT DOCUMENTS

| | | | |
|---|---|---|---|
| 4,868,682 A | | 9/1989 | Shimizu et al. |
| 5,130,794 A | | 7/1992 | Ritchey |
| 5,287,437 A | * | 2/1994 | Deering ........................ 345/427 |
| 5,703,604 A | * | 12/1997 | McCutchen .................... 348/36 |
| 5,822,117 A | * | 10/1998 | Kleinberger et al. ......... 359/465 |
| 5,943,056 A | * | 8/1999 | Sato et al. ..................... 345/419 |
| 5,982,375 A | * | 11/1999 | Nelson et al. ................ 345/419 |
| 6,002,430 A | * | 12/1999 | McCall et al. ............. 348/207.99 |
| 6,016,151 A | * | 1/2000 | Lin .............................. 345/582 |
| 6,097,854 A | * | 8/2000 | Szeliski et al. ............... 382/284 |
| 6,108,005 A | * | 8/2000 | Starks et al. ................. 345/419 |
| 6,141,034 A | | 10/2000 | McCutchen |
| 6,252,601 B1 | * | 6/2001 | Tanaka ......................... 345/423 |
| 6,292,191 B1 | * | 9/2001 | Vaswani et al. .............. 345/582 |
| 6,396,639 B1 | * | 5/2002 | Togino et al. ................ 359/630 |
| 6,518,963 B1 | | 2/2003 | Waupotitsch et al. |
| 6,522,325 B1 | | 2/2003 | Sorokin et al. |
| 6,831,643 B2 | * | 12/2004 | Aliaga et al. ................. 345/427 |
| 6,975,322 B2 | * | 12/2005 | Lavelle ........................ 345/543 |
| 7,015,954 B1 | * | 3/2006 | Foote et al. ................ 348/218.1 |
| 7,034,826 B1 | * | 4/2006 | Bronder ....................... 345/423 |
| 7,095,418 B2 | * | 8/2006 | Levene et al. ................ 345/582 |
| 7,280,113 B1 | * | 10/2007 | Leung et al. ................. 345/582 |

FOREIGN PATENT DOCUMENTS

| | | |
|---|---|---|
| WO | WO-2006124638 A2 | 11/2006 |
| WO | WO-2006124638 A3 | 11/2006 |
| WO | WO-2006124640 A2 | 11/2006 |

OTHER PUBLICATIONS

Foley et al. Computer Graphics: Principles and Practice. Addison-Wesley Pub. Co. 1997. pp. 237-242, 253, 915, 916.*
Bourke. Stereoscopic 3D Panoramic Images. 2004. http://local.wasp.uwa.edu.au/~pbourke/projection/stereopanoramic/.*

(Continued)

*Primary Examiner*—Peter-Anthony Pappas
(74) *Attorney, Agent, or Firm*—Charles A. Lemaire; Lemaire Patent Law Firm, P.L.L.C.

(57) ABSTRACT

Apparatus and systems, as well as methods and articles, may operate to store portions of a spherical image in a storage medium as a pair of triangles included in a convex quadrilateral. The triangles may form a portion of one or more substantially uniformly tessellated spherical surfaces.

30 Claims, 5 Drawing Sheets

OTHER PUBLICATIONS

Li et al. Spherical Stereo for the Construction of Immersive VR Environment. IEEE Computer Society. Mar. 2005.*

Chen. QuickTime VR—An Image-Based Approach to Virtual Environment Navigation. ACM Special Interest Group on Computer Graphics and Interactive Techniques. 1995. pp. 29-38.*

Peleg et al. Omnistereo: Panoramic Stereo Imaging. IEEE Transactions on Pattern Analysis and Machine Intelligence. vol. 23. Issue 3. Mar. 2001. pp. 279-290.*

Li et al. Acquisition of Spherical Image by Fish-eye Conversion Lens. Proceedings of the IEEE Virtual Reality 2004. 2004.*

Praun. Spherical Parametrization and Remeshing. International Conference on Computer Graphics and Interactive Techniques. 2003.*

Aliaga et al. Plenoptic Stitching: A Scalable Method for Reconstructing 3D Interactive Walkthroughs. International Conference on Computer Graphics and Interactive Techniques. 2001.*

Szeliski. Video Mosaics for Virtual Environments. IEEE Computer Graphics and Applications. vol. 16. Issue 2. Mar. 1996.*

Fisher. Viewpoint Dependent Imaging: An Interactive Stereoscopic Display. Massachusetts Institute of Technology. 1982.*

"U.S. Appl. No. 10/416,533 Non-Final Office action mailed Sep. 6, 2006", 12 pgs.

"International Search Report, Application No. PCT/US2006018499", 4 pgs.

* cited by examiner

IMAGE PROCESSING AND DISPLAY

RELATED APPLICATIONS

This disclosure is related to pending U.S. patent application Ser. No. 11/128,845, titled "Image Capture and Processing", filed on May 13, 2005, assigned to the assignee of the embodiments disclosed herein, Micoy Corporation, and incorporated herein by reference in its entirety.

TECHNICAL FIELD

Various embodiments described herein relate to image processing generally, including apparatus, systems, and methods used to capture, process, and display image information.

BACKGROUND INFORMATION

Omni-stereo imaging research may involve the capture and display of stereoscopic (stereo) three-dimensional imagery for substantially all of an environment (omni). Many techniques have been developed for capturing omni-directional monoscopic imagery of an environment using wide-angle lenses, mirrors, and various image mosaicing techniques. Similarly, many techniques have been developed for capturing stereoscopic imagery. There are even some techniques that combine the two technologies to capture stereoscopic omni-directional (omni-stereo) imagery.

The predominant existing method uses spherical imagery that has been stored in an equirectangular image format, where the horizontal coordinate corresponds to longitude, and the vertical coordinate corresponds to latitude, for various points on the surface of a sphere. The equirectangular image format is used for viewing spherical imagery because it maps easily onto the longitude and latitude lines of a three-dimensional sphere, and is therefore straightforward to program and process using available computer graphics techniques.

Once the image environment surrounding a particular viewpoint has been stored as an equirectangular image, it's possible to generate perspective views of the environment from a variety of viewing directions using a computer. Viewing spherical imagery using the equirectangular image format can work well for individual images, but is decidedly less convenient for viewing spherical movies.

Though spherical movies might be viewed using periodic display of equirectangular images mapped to a three-dimensional viewing sphere, this technique is rather inefficient, since the system processes much more image data than is typically displayed to the user. In part, this is due to the inefficiencies of the equirectangular image format itself, since the application of this format to the surface of a sphere results in pixel lines that shrink in length as they proceed towards the sphere's top and bottom apexes, scaled according to their length along the spherical surface. This results in storing approximately 36% more image data than will ever be seen when mapped onto a spherical surface.

Longitude/latitude based three-dimensional sphere representations commonly used for viewing spherical imagery provide similar inefficiencies as the top and bottom apexes are approached. For example, when computer graphics representations of three-dimensional surfaces are based on a discrete set of triangular polygons, though a sphere's surface should be substantially uniform, the polygons generated by this method are not. The polygons shrink in size and become more densely packed as they approach the sphere's top and bottom apexes. As a result, the computer used for viewing the spherical imagery must process significantly more geometric information for virtual camera views approaching the sphere's top and bottom apexes, even though the surface properties of the apex areas are no different from those near the sphere's equator.

DETAILED DESCRIPTION

Various embodiments disclosed herein may address the challenge of increasing image processing and display efficiency by employing a spherical image format that captures image data across the spherical surface in a more evenly distributed fashion. In some embodiments, a spherical surface may be divided into substantially equally tessellated polygons, such as triangles. The image data from a pair of triangles may subsequently be combined and stored in a substantially rectangular format in computer memory.

For the purposes of this document, the following terms may be defined:

"omniscopic image set" may include all of the image data for a single omniscopic spherical image, perhaps comprising a plurality of triangular images.

"rectangle", "rectangular image", or "rectangle image" may be formed from a combination of two triangle images. The triangular images may both be taken from a single omniscopic image set, or as a stereo pair: one from a left eye omniscopic spherical image, and one from a right eye omniscopic spherical image, as part of an omni-stereo image set.

"omni-stereo image set" may include all of the image data for a pair of corresponding omniscopic spherical images, one for a left eye viewpoint, and one for a corresponding right eye viewpoint.

"triangle", "triangular image", or "triangle image" may refer to image data included in a triangular portion of a substantially uniformly tessellated spherical surface, such as an omniscopic spherical image.

Figure 1A:
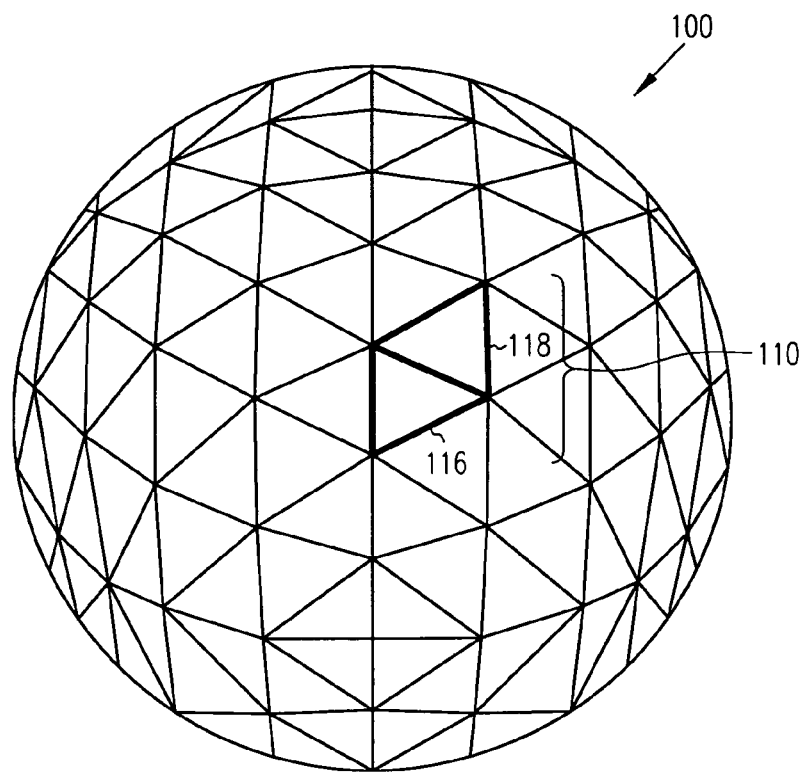
FIGS. 1A-1B illustrate substantially uniformly tessellated spherical surfaces according to various embodiments of the invention.
Figure 1B:
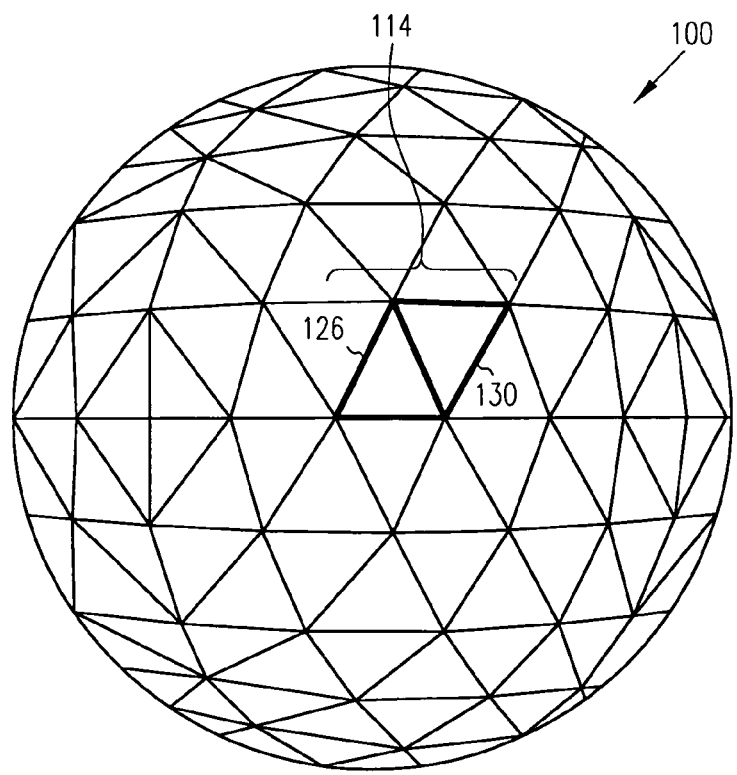

FIGS. 1A-1B illustrate substantially uniformly tessellated spherical surfaces 100, 106 according to various embodiments of the invention. As shown in FIGS. 1A and 1B, the longitude/latitude based image representation used for viewing spherical imagery may be replaced with a more efficient surface representation.

For example, FIG. 1A shows an omniscopic spherical image having an octahedron-based substantially uniformly tessellated surface 100. FIG. 1B shows an omniscopic spherical image having an icosahedron-based substantially uniformly tessellated surface 106. Thus, a number of approaches to subdividing spheres may begin with one of the platonic solids, including those polyhedra having faces with equal area, equal edges, and equal angles. Examples include tetrahedrons, hexahedrons, octahedrons, dodecahedrons, and icosahedrons. Various mathematical techniques, known to those of skill in the art, may be used to generate substantially uniformly tessellated spherical surfaces based on such polyhedra. Any such representation may be used to implement the techniques described herein.

The uniformly tessellated spherical representation can increase computer performance lost to geometric inefficiency, but the inefficiency residing in the equirectangular image format must still be addressed. Ideally, substantially the same number of image pixels should be used to represent substantially the same amount of surface area across the entire sphere's surface. This goal may be achieved by capturing the image data corresponding to each of the uniformly tessellated sphere's triangular polygons, for example, and storing it as a set of rectangular images (e.g., combinations of paired triangles).

Figure 2:
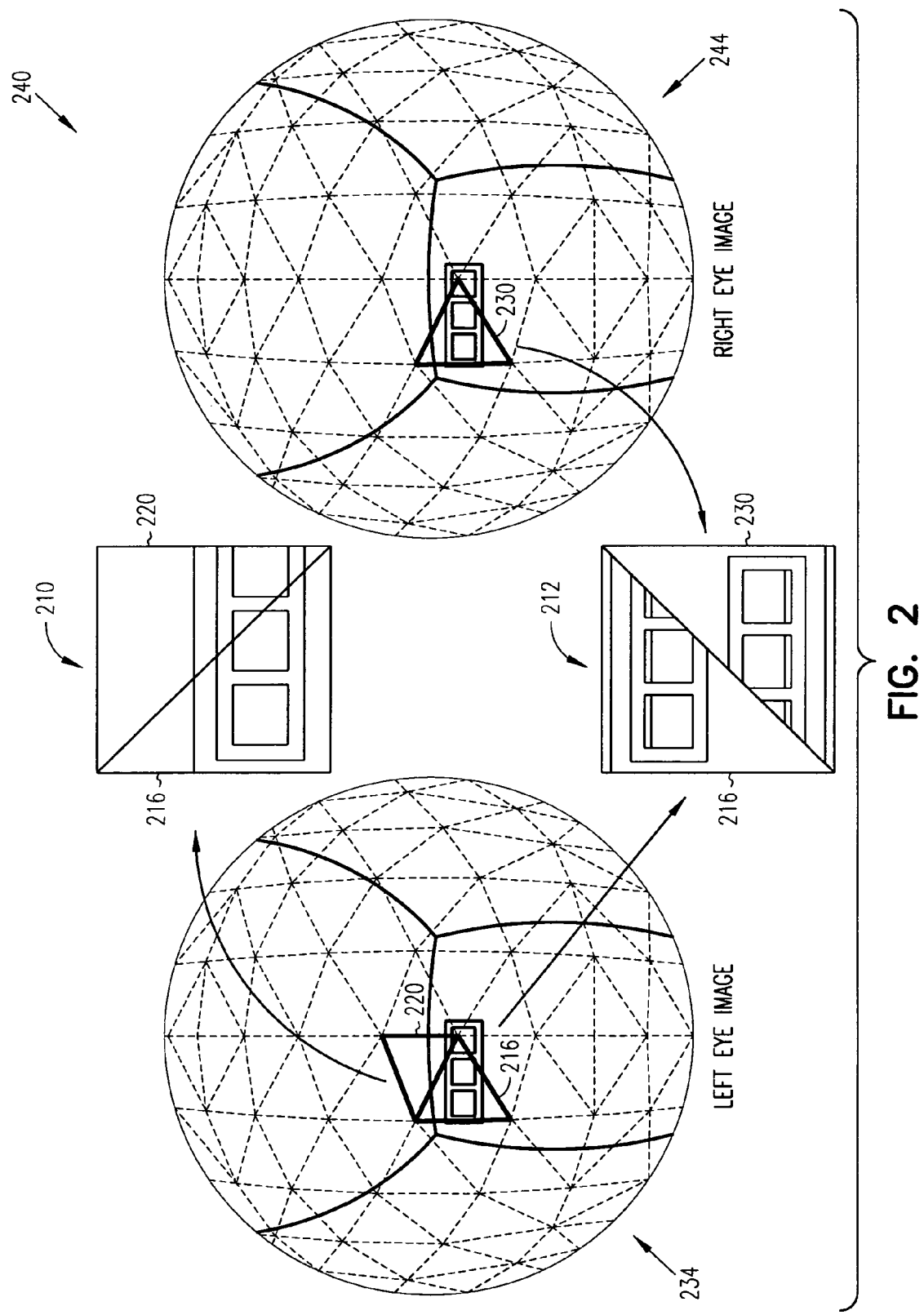
FIG. 2 illustrates image storage techniques according to various embodiments of the invention.

FIG. 2 illustrates image storage techniques according to various embodiments of the invention. Here a rectangular image 210, 212 is shown to contain two distinct triangle's (216, 220 and 216, 230 respectively) of image data. When representing a monoscopic spherical image 234, each rectangular image 210 may include the image data for two adjacent triangles 216, 220. This can also be seen in FIGS. 1A and 1B, where rectangular images 110, 114 may comprise two triangles 116, 118 and 126, 130, respectively, of image data. It should be noted that the image data included in the rectangular images 110, 114, 210, 212 does not necessarily have to be stored as a "physical rectangle" or rectangular matrix in memory, although that is certainly an option. Rather, "storing a pair of triangles as a convex quadrilateral" can mean that data from the pair of triangles is combined in some fashion, and then stored as a unitary combination of data, accessible as a unit of data that may be used to reproduce the image information associated with that particular pair of triangles. Thus, the image data from the pair of triangles may be interleaved, compressed, intermingled, or re-arranged in a number of ways to form a unit that can be stored, accessed, and processed as a unified whole. Other possibilities will be noted below.

The rectangular image set representation may be adapted to store stereoscopic spherical image sets. By definition, a stereoscopic spherical image set 240 is comprised of two monoscopic spherical images 234, 244. Each of the monoscopic spherical images 234, 244 are images of the surrounding environment captured from a different viewpoint. Usually, one image contains the environment as seen by a virtual camera corresponding to a viewer's left eye (e.g., image 234), and the other contains the environment as seen by a virtual camera corresponding to the viewer's right eye (e.g., image 244). When a stereoscopic image set 240 is displayed to a viewer, left eye image data is displayed to the viewer's left eye, and right eye image data is displayed to the viewer's right eye, producing a stereoscopic three-dimensional effect.

Since the left and right eye image sections corresponding to a particular portion of the viewing sphere will usually be displayed together, it may be useful to store them together. Conveniently, each rectangular image 212 in an image set representation may comprise two separate triangular polygons worth of image data (e.g., triangles 216, 230). Consequently, when storing portions of stereoscopic spherical imagery, a single triangle's worth of image data (e.g., triangles 216, 230) from each of two monoscopic spherical images 234, 244 may be stored as a rectangle of image data (e.g., rectangle 212).

In some embodiments, multiple texture images may be used in combination to simulate complex surface properties. The dual or paired triangle image representation described previously also lends itself to storing these complex spherical textures. For example, a desired texture effect may be achieved by using a diffuse texture map in combination with a bump or displacement map. Other common texture map types include specular, refraction, reflection, and opacity maps. The paired triangle image representation can be used to store any such combination of two texture maps as a rectangular image. Multiple diffuse texture versions of the same image data can also be stored together in this way. For example, standard diffuse and infrared image data could be stored together as a pair of triangles, allowing the user of a spherical video application to interactively switch back and forth between those two image types. Thus, a pair of triangles may include a first triangle associated with a texture map of a first type, and a second triangle associated with a texture map of a second type different from the first type.

While the substantially uniformly tessellated polygonal image format described previously may greatly reduce inefficiencies subsisting in the equirectangular image format, further improvements can be made in terms of computer storage requirements. For example, any known image compression technique can be applied to each of the triangular or rectangular images within an image set comprising a single spherical image, thereby reducing the electronic storage space requirements of the imagery. Additional compression can be performed on stereoscopic image sets that take advantage of similarities found between the left eye and right eye image data for any particular image region.

When viewing a sequence of spherical images as a movie, further compression can be achieved by applying any known video compression technique to the sequence of triangular and rectangular image sets. Such compression may provide a set of video files, each video file including the sequence of image data corresponding to two distinct triangular polygons. Thus some embodiments may include methods that operate by compressing substantially similar information included between temporally adjacent triangle pairs, especially when such pairs are acquired or displayed in movies and other temporally-sequenced image data.

The technique of breaking up spherical image data into separate image or video files can be useful when viewing the imagery. For example, when a spherical image is viewed through a centralized virtual camera, only a portion of the entire image is displayed to the user. Often less than 10% of the scene is displayed to the user at any given time, meaning that 90% of the imagery is not viewed. Since spherical imagery usually contains a large amount of information, loading 90% more image data than needed can waste processing and display resources, increasing the computing requirements necessary to provide a satisfactory viewing experience. The problem is most pronounced when viewing spherical movies, as the preferred frame rate may be approximately thirty frames per second, or more.

Figure 3A:
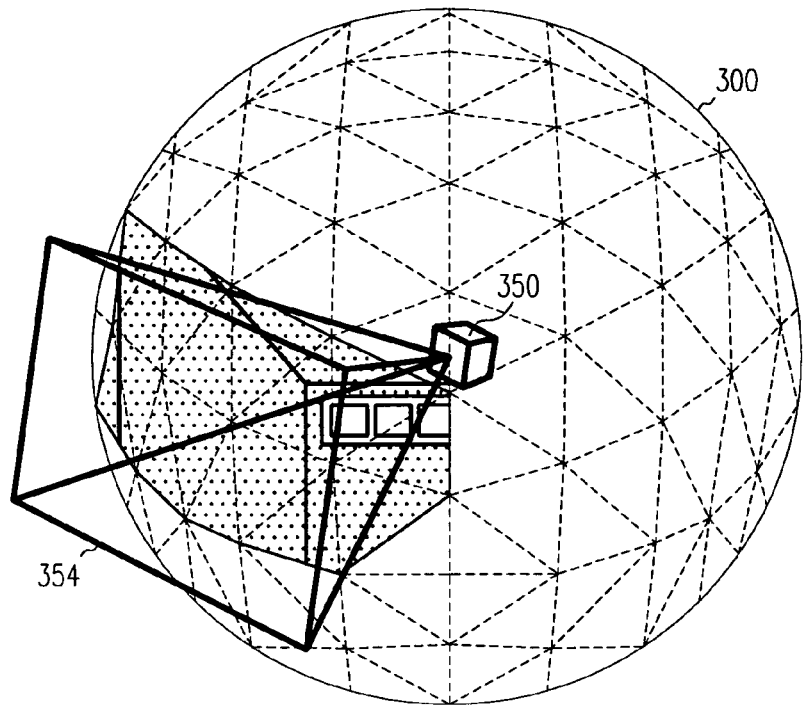
FIGS. 3A-3B illustrate polygon culling techniques according to various embodiments of the invention.
Figure 3B:
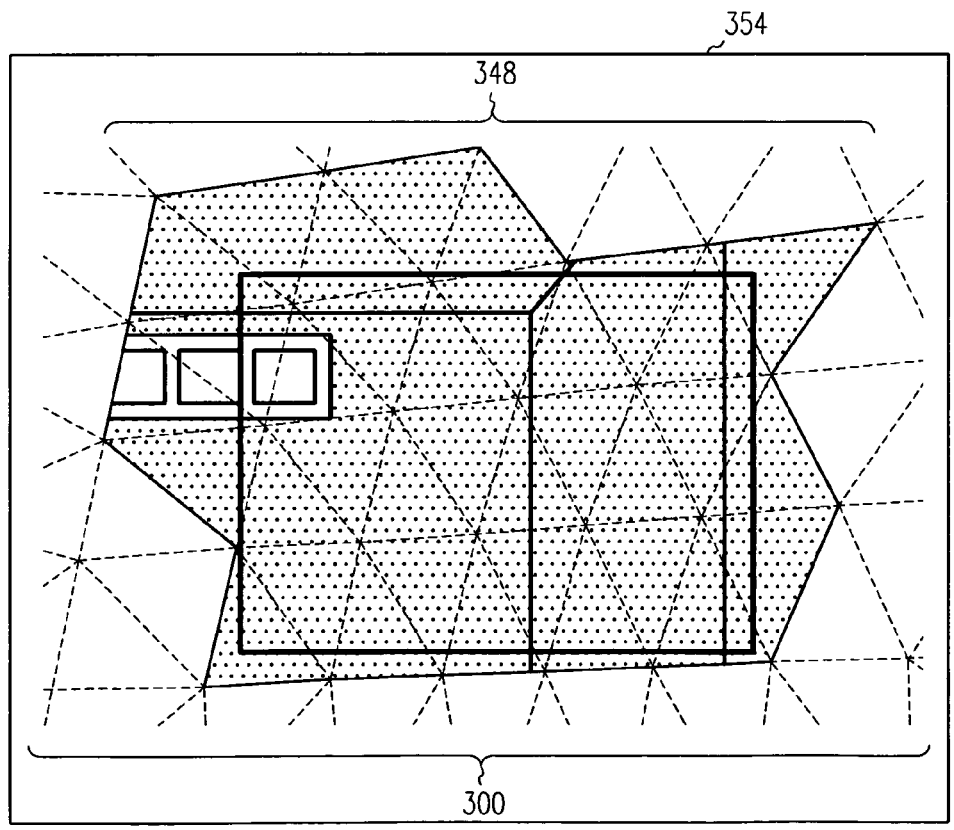

FIGS. 3A-3B illustrate polygon culling techniques according to various embodiments of the invention. Rectangular image and video set representation, as described herein, permits a significant reduction in the amount of data loading required for viewing spherical imagery and video presentations. For example, at each instant of time, a polygon culling algorithm may be applied to uniformly tessellated spherical surface 300 geometry. This culling algorithm can be used to determine which of the sphere's polygons 348 are currently visible through a selected virtual camera 350 viewpoint. In some embodiments, only the image data corresponding to visible polygons 348 is loaded for viewing or projection to a display surface 354, which may include a computer display, such as a flat-panel display, a cathode-ray tube, or a wall. All other polygons associated with the selected viewpoint are ignored until the position of the virtual camera 350 changes, when the process of culling polygons may be repeated. In some embodiments, when viewing spherical video imagery, only the video files corresponding to visible polygons are updated to the current video frame.

Figure 4:
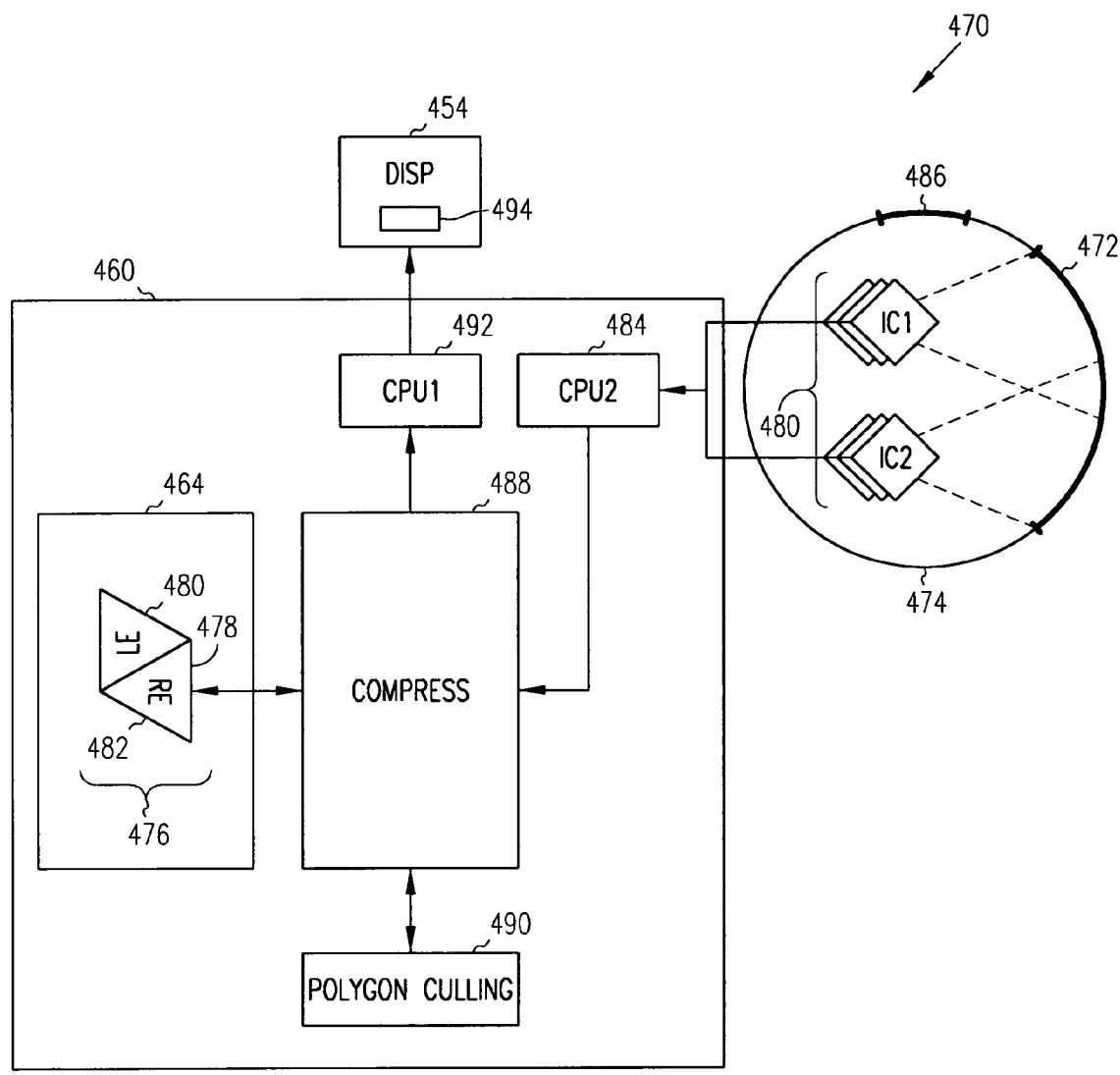
FIG. 4 is a block diagram illustrating apparatus and systems according to various embodiments of the invention.

FIG. 4 is a block diagram illustrating apparatus 460 and systems 470 according to various embodiments of the invention, each of which may operate in the manner described above. The apparatus 460 may include image storage media 464, such as semiconductor memory, or magnetic/optical disks, or combinations of these, to store a first portion 472 of a spherical image 474 as a pair of triangles 476 included in a convex quadrilateral 478. In some embodiments, such as a camera, including a video camera, the apparatus 460 may include one or more image capture media 480 to capture a subset of the first portion 472 including at least one of the pair of triangles 476. Image capture media 480 may include photosensitive solid state devices, such as charge-coupled devices, among others.

The pair of triangles 476 may include a first triangle 480 associated with a left eye view, and a second triangle 490 associated with a right eye view. As noted above, the pair of triangles 476 may be included in a plurality of triangles forming a substantially uniformly tessellated portion of a spherical image (e.g., see FIG. 1).

It should be noted that the spherical image 474 may comprise a monoscopic spherical image or a stereoscopic spherical (e.g., omni-stereo) image. In the case of a monoscopic spherical image 474, the pair of triangles 476 may be adjacent each other in a substantially uniformly tessellated portion of the spherical image 474.

Some embodiments the apparatus 460 may include a processor 484 to control repetitive acquisition of other portions 486 of the spherical image 474 and storage of the other portions 486 in the image storage medium 464. The apparatus 460 may also include a data compression module 488 to receive and to compress information included in the pair of triangles 476. In some embodiments, the apparatus 460 may include a polygon culling module 490 to couple to the processor 484 and to determine whether the pair of triangles 476 is included in a virtual camera view, as described previously.

Other embodiments may be realized. For example, a system 470 may include one or more apparatus 460, described previously. The system 470 may also include one or more processors 492 to couple to the image storage medium 464 and to provide information, typically in the form of electrical signals, to display at least a subset of the portion 472 of the spherical image 474. Thus, some embodiments may include a system 470 that has a display surface 454 to display at least a subset 494 of the first portion of the spherical image 474. The display surface may include a video screen, a wall, or the interior of a virtual reality helmet, among others. Again, the pair of triangles 476 may be included in a plurality of triangles forming a substantially uniformly tessellated portion of a spherical image, and the pair of triangles 476 may include a first triangle 480 associated with a left eye view, and a second triangle 482 associated with a right eye view.

The substantially uniformly tessellated spherical surfaces 100, 106, 300; rectangular image 110, 114, 210, 212; triangles 116, 118, 126, 130, 216, 220, 230, 476, 480, 482; monoscopic spherical images 234, 244; stereoscopic spherical image set 240; polygons 348; virtual camera 350; display surfaces 354, 454; apparatus 460; image storage media 464; systems 470; spherical image portions 472, 486; spherical image 474; convex quadrilateral 478; image capture media 480; processors 484, 492; data compression module 488; polygon culling module 490; and subset 494 may all be characterized as "modules" herein.

Such modules may include hardware circuitry, processors, memory circuits, software program modules and objects, firmware, and/or combinations thereof, as desired by the architect of the apparatus 360 and systems 370, and as appropriate for particular implementations of various embodiments. For example, such modules may be included in a system operation simulation package, such as a software electrical signal simulation package, a power usage simulation package, an image processing package; a movie display package; a power/heat dissipation simulation package, a signal transmission-reception simulation package, and/or a combination of software and hardware used to simulate the operation of various potential embodiments.

It should also be understood that the apparatus and systems of various embodiments can be used in applications other than acquisition, processing, and display of omni-stereo images, and thus, various embodiments are not to be so limited. The illustrations of apparatus 360 and systems 370 are intended to provide a general understanding of the structure of various embodiments, and they are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, processor modules, embedded processors, data switches, and application-specific modules, including multilayer, multi-chip modules. Such apparatus and systems may further be included as sub-components within a variety of electronic systems, such as televisions, cellular telephones, personal computers, workstations, radios, video players, cameras, projectors, vehicles, and others. Some embodiments include a number of methods.

Figure 5:
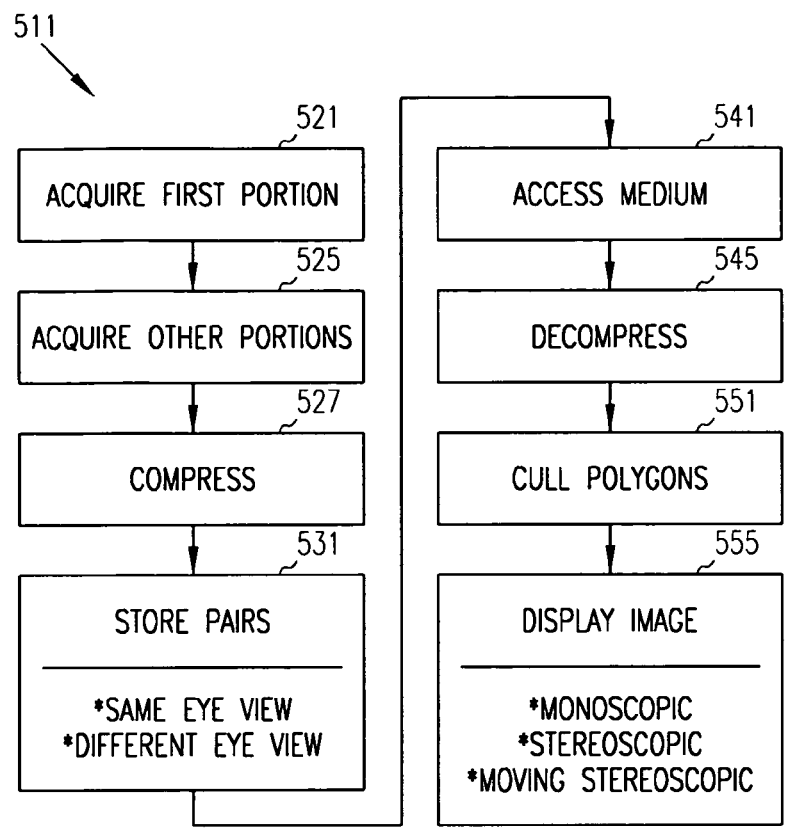
FIG. 5 is a flow diagram illustrating several methods according to various embodiments of the invention.

For example, FIG. 5 is a flow diagram illustrating several methods according to various embodiments of the invention. Thus, a method 511 may (optionally) begin at block 521 with acquiring the first portion of a spherical image (e.g., a monoscopic or stereoscopic image), and then acquiring other portions of the spherical image at block 525. In some embodiments, the method 511 may include compressing substantially similar information included in the acquired image portion, such as may be included in a pair of image triangles, using any known data compression algorithm. For example, the information in each one of a pair of triangles may be compressed separately, and then stored, or the information in both triangles may be combined in some fashion, compressed, and then stored. Thus, the method 511 may include storing the first (and other) portions of the spherical image at block 531.

Storage of the spherical image portions may take many forms. For example, the first portion may be stored in a storage medium as a pair of triangles included in a convex quadrilateral. For the purposes of this document, the terminology "storing a triangle" may be used to denote storing image data included in a triangular portion of a substantially uniformly tessellated image. The terminology "storing a pair of triangles included in a convex quadrilateral" may be used to denote storing image data included in two triangular portions of a substantially uniformly tessellated image. The triangles may be combined as triangular portions of two matrices, for example, to form a single rectangular matrix, for example. Thus, subsequent portions of the spherical image may be stored as subsequent pairs of triangles in the storage medium.

As noted previously, the triangles in each pair may be taken from image portions seen from a single viewpoint. However, a pair of triangles may also represent images taken from different viewpoints, such as where one or more pairs of triangles includes a first triangle associated with a left eye view, and a second triangle associated with a right eye view. The triangles may be included in a plurality of triangles forming a substantially uniformly tessellated portion of the spherical image. In some embodiments, the pair of triangles may be adjacent each other in the substantially uniformly tessellated portion of the spherical image.

The method 511 may continue at block 541 with accessing the storage medium to retrieve the information stored therein (e.g., stored pairs of triangles, or stored convex quadrilaterals). The method 511 may include decompressing the information included in stored pairs of triangles or convex quadrilaterals at block 545, and culling the pair of triangles from a plurality of other polygons not included in a selected virtual camera view at block 551.

The method 511 may conclude with displaying at least a subset of one or more portions of the spherical image at block 555. Displaying a subset of the spherical image portions may include displaying the subset as a monoscopic image, a stereoscopic image, or as part of a moving stereoscopic image, for example.

It should be noted that the methods described herein do not have to be executed in the order described, or in any particular order. Moreover, various activities described with respect to the methods identified herein can be executed in repetitive, serial, or parallel fashion. Information, including parameters, commands, operands, and other data, can be sent and received in the form of one or more carrier waves.

Upon reading and comprehending the content of this disclosure, one of ordinary skill in the art will understand the manner in which a software program can be launched from a computer-readable medium in a computer-based system to execute the functions defined in the software program. One of ordinary skill in the art will further understand the various programming languages that may be employed to create one or more software programs designed to implement and perform the methods disclosed herein. The programs may be structured in an object-orientated format using an object-oriented language such as Java or C++. Alternatively, the programs can be structured in a procedure-orientated format using a procedural language, such as assembly or C. The software components may communicate using any of a number of mechanisms well known to those skilled in the art, such as application program interfaces or interprocess communication techniques, including remote procedure calls. The teachings of various embodiments are not limited to any particular programming language or environment.

Figure 6:
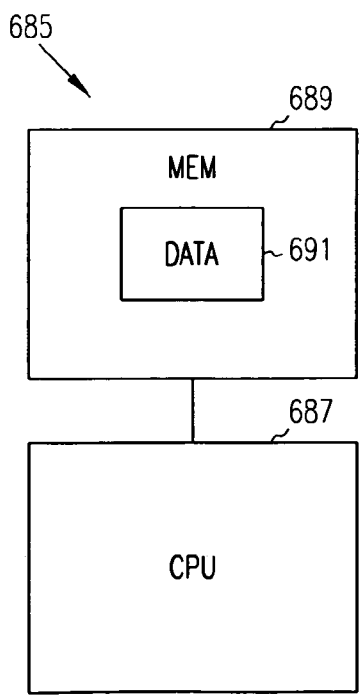
FIG. 6 is a block diagram of an article according to various embodiments of the invention.

Thus, other embodiments may be realized. For example, FIG. 6 is a block diagram of an article 685 according to various embodiments of the invention. Examples of such embodiments include a computer, a memory system, a magnetic or optical disk, some other storage device, and/or any type of electronic device or system. The article 685 may include a processor 687 coupled to a machine-accessible medium such as a memory 689 (e.g., a memory including an electrical, optical, or electromagnetic conductor) having associated information 691 (e.g., computer program instructions and/or data), which, when accessed, results in a machine (e.g., the processor 687) performing such actions as acquiring a first portion of a spherical image and storing the first portion of the spherical image in a storage medium as a pair of triangles included in a convex quadrilateral.

Other actions may include acquiring other portions of the spherical image, and storing the other portions of the spherical image as subsequent pairs of triangles in the storage medium. Further actions may include accessing the storage medium, and displaying at least a subset of the portion of the spherical image. Display may include displaying the subset as a monoscopic image, a stereoscopic image, or as a part of a moving stereoscopic image, as noted above.

Implementing the apparatus, systems, and methods disclosed herein may significantly reduce the amount of electronic data storage and processing power needed to view monoscopic and stereoscopic spherical images. Such reductions may be accomplished by combining the effects of using uniformly tessellated spherical surface geometry, operating on sets of rectangular image data taken from polygons mapped to spherical surfaces, and culling unseen polygons from selected viewpoints.

The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An apparatus, including:
   an image storage medium having stored thereon image data from a first portion of a spherical image as a pair of triangles included in a convex quadrilateral, wherein the pair of triangles includes a first triangle associated with a left eye view and a second triangle associated with a right eye view, wherein the image data from the pair of triangles is configured and stored on the storage medium as a unitary combination of data accessible as a unit of data usable by a processor to reproduce the first portion of the image associated with the pair of triangles.

2. The apparatus of claim 1, further including:
an image capture medium to capture a subset of the first portion including at least one of the pair of triangles.

3. The apparatus of claim 1, wherein the pair of triangles includes a first triangle associated with a texture map of a first type, and a second triangle associated with a texture map of a second type different from the first type.

4. The apparatus of claim 1, wherein the pair of triangles is included in a plurality of triangles forming a substantially uniformly tessellated portion of the spherical image.

5. The apparatus of claim 4, wherein the pair of triangles are adjacent each other in the substantially uniformly tessellated portion of the spherical image.

6. The apparatus of claim 1, further including:
a processor to control repetitive acquisition of other portions of the spherical image and storage of the other portions in the image storage medium.

7. The apparatus of claim 1, further including:
a data compression module to receive and to compress information included in the pair of triangles.

8. An apparatus, including:
an image storage medium having stored thereon a first portion of a spherical image as a pair of triangles included in a convex quadrilateral, wherein the pair of triangles includes a first triangle associated with a left eye view and a second triangle associated with a right eye view and is readable by a processor and usable by the processor to reproduce the first portion of the spherical image associated with the pair of triangles.

9. A system, including:
an image storage medium having stored thereon image data from a portion of a spherical image as a pair of triangles included in a convex quadrilateral, wherein the pair of triangles includes a first triangle associated with a left eye view, and a second triangle associated with a right eye view, wherein the image data from the pair of triangles is configured and stored on the storage medium as a unitary combination of data accessible as a unit of data usable to reproduce the portion of the image associated with the pair of triangles; and
a processor operatively coupled to the image storage medium and configured to provide information to display at least a subset of the portion of the spherical image.

10. The system of claim 9, further including:
a display surface to display the at least a subset of the first portion of the spherical image.

11. The system of claim 9, wherein the pair of triangles is included in a plurality of triangles forming a substantially uniformly tessellated portion of the spherical image.

12. The system of claim 9, further including:
a polygon culling module to couple to the processor and to determine whether the pair of triangles is included in a virtual camera view.

13. A system, including:
an image storage medium having stored thereon a portion of a spherical image as a pair of triangles included in a convex quadrilateral; and
a processor operatively coupled to the image storage medium and configured to provide information to display at least a subset of the portion of the spherical image, wherein the pair of triangles includes a first triangle associated with a left eye view and a second triangle associated with a right eye view.

14. A method, including:
storing image data from a first portion of a spherical image in a storage medium as a pair of triangles included in a convex quadrilateral, wherein the pair of triangles includes a first triangle associated with a left eye view and a second triangle associated with a right eye view, and wherein the image data from the pair of triangles is configured and stored on the storage medium as a unitary combination of data accessible as a unit of data usable by a processor to reproduce the first portion of the image associated with the pair of triangles.

15. The method of claim 14, wherein the pair of triangles includes a first triangle associated with a texture map of a first type and a second triangle associated with a texture map of a second type different from the first type.

16. The method of claim 14, wherein the pair of triangles is included in a plurality of triangles forming a substantially uniformly tessellated portion of the spherical image.

17. The method of claim 16, wherein the pair of triangles are adjacent each other in the substantially uniformly tessellated portion of the spherical image.

18. The method of claim 14, further including:
acquiring the first portion of the spherical image;
acquiring other portions of the spherical image; and
storing the other portions of the spherical image as subsequent pairs of triangles in the storage medium.

19. The method of claim 14, further including:
accessing the storage medium; and
displaying at least a subset of the portion of the spherical image.

20. The method of claim 19, wherein displaying at least the subset of the portion of the spherical image further includes:
displaying the at least the subset of the portion of the spherical image as a stereoscopic image.

21. The method of claim 19, wherein displaying at least the subset of the portion of the spherical image further includes:
displaying the at least the subset of the portion of the spherical image as part of a moving stereoscopic image.

22. The method of claim 14, further including:
compressing similar information included in the pair of triangles.

23. The method of claim 14, further including:
compressing similar information included between the pair of triangles and a temporally adjacent pair of triangles.

24. The method of claim 14, further including:
culling the pair of triangles from a plurality of other polygons not included in a virtual camera view.

25. A method, including:
storing a first portion of a spherical image in a storage medium as data representing a pair of triangles included in a convex quadrilateral, wherein the pair of triangles includes a first triangle associated with a left eye view and a second triangle associated with a right eye view such that the data is readable by a processor and usable by the processor to reproduce the first portion of the spherical image associated with the pair of triangles.

26. An article including a machine-accessible medium having associated information, wherein the information, when accessed and executed by a machine, results in the machine performing:
storing image data from a first portion of a spherical image in a storage medium as a pair of triangles included in a convex quadrilateral, wherein the pair of triangles includes a first triangle associated with a left eye view and a second triangle associated with a right eye view, and wherein the image data from the pair of triangles is configured and stored on the storage medium as a unitary combination of data accessible as a unit of data usable by the machine to reproduce the first portion of the image associated with the pair of triangles.

27. The article of claim 26, wherein the information, when accessed, results in a machine performing:

acquiring the first portion of the spherical image;

acquiring other portions of the spherical image; and storing the other portions of the spherical image as subsequent pairs of triangles in the storage medium.

28. The article of claim 26, wherein the information, when accessed, results in a machine performing:

accessing the storage medium; and displaying at least a subset of the portion of the spherical image.

29. The article of claim 28, wherein displaying at least the subset of the portion of the spherical image further includes:

displaying the at least the subset of the portion of the spherical image as a stereoscopic image.

30. The article of claim 28, wherein displaying at least the subset of the portion of the spherical image further includes:

displaying the at least the subset of the portion of the spherical image as part of a moving stereoscopic image.

* * * * *

UNITED STATES PATENT AND TRADEMARK OFFICE
CERTIFICATE OF CORRECTION

PATENT NO. : 7,656,403 B2  Page 1 of 1
APPLICATION NO. : 11/128712
DATED : February 2, 2010
INVENTOR(S) : Grover et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1150 days.

Signed and Sealed this

Thirtieth Day of November, 2010

David J. Kappos
*Director of the United States Patent and Trademark Office*